Feb. 24, 1925.  
R. P. OXLEY  
AIR PRESSURE GAUGE  
Filed July 19, 1923
1,527,436
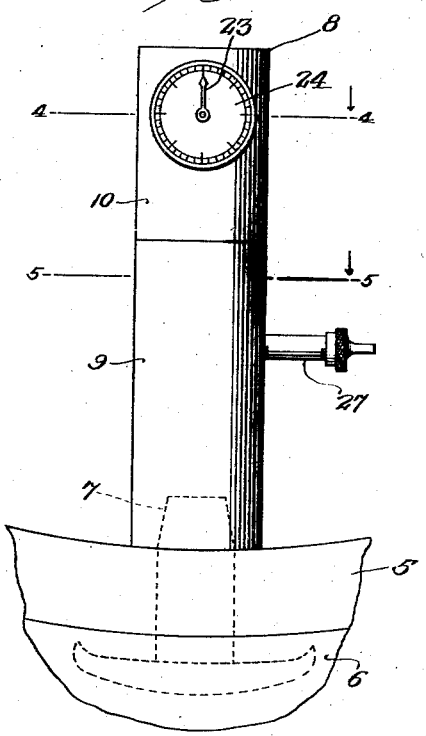
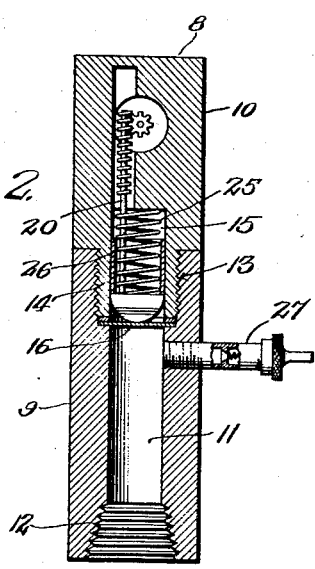
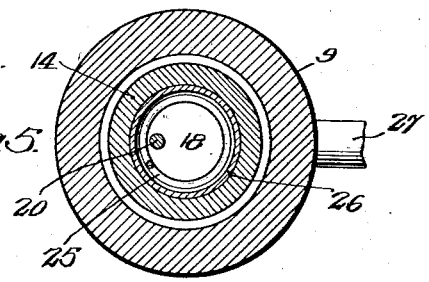
Inventor  
Hobert P. Oxley,  
By Bernard F. Garvey  
Attorney Patented Feb. 24, 1925.

1,527,436

UNITED STATES PATENT OFFICE.

ROBERT P. OXLEY, OF SALISBURY, NORTH CAROLINA, ASSIGNOR OF ONE-HALF TO WILLIAM H. FIFER, OF SALISBURY, NORTH CAROLINA.

AIR-PRESSURE GAUGE.

Application filed July 19, 1923. Serial No. 652,572.

*To all whom it may concern:*

Be it known that I, ROBERT P. OXLEY, a citizen of the United States, residing at Salisbury, in the county of Rowan and State of North Carolina, have invented certain new and useful Improvements in Air-Pressure Gauges, of which the following is a specification.

The present invention relates to air pressure gauges especially adapted for use on pneumatic vehicle tires.

An object of the invention is to provide means of the above mentioned type which is responsive to the air pressure in the tire and is attached to the wheel to indicate at all times the amount of air in the tire.

A further object of the invention is to provide an exceedingly simple device of this character which may be quickly and conveniently engaged with the felly of the wheel and in no way retards inflation of the tire in the usual manner yet permits unrestricted influx of air into the air gauge chamber to instantly and positively operate the gauge.

Other objects of the invention will be apparent from the following description of the present preferred form of the invention taken in connection with the accompanying drawings wherein:—

Fig. 1 is a front elevational view of a gauge constructed in accordance with this invention illustrating its application;

Fig. 2 is a longitudinal sectional view of the gauge;

Fig. 3 is an elevational view, partly in section, of a slightly modified form of the invention;

Fig. 4 is a horizontal sectional view of the gauge taken on the line 4—4 of Fig. 1 looking in the direction of the arrows; and Fig. 5 is a horizontal sectional view taken on the line 5—5 of Fig. 1.

In the drawings in order to illustrate the application of this invention a portion of a wheel felly 5 is shown which has a portion of a tire 6 mounted thereon. The tire is equipped with a tapering screw-threaded nipple 7 which may form a part of the tire or be attached to the standard type of valve stem now commonly used on pneumatic tires. The nipple 7 radiates outwardly beyond the inner periphery of the felly of the wheel.

The air pressure indicating means or gauge is generally designated 8 and consists of a housing which in the present instance is shown to be of a cylindrical configuration embodying an inner part 9 and an outer part 10. The inner part 9 is provided with a central bore 11 one end of which issues into a tapering screwthreaded portion 12 which complements and is adapted for engagement with the threaded nipple 7 of the tire. The outer end of the bore 11 issues into a screwthreaded recess 13 the diameter of which is in excess of the diameter of the bore and is adapted for engagement with an inner reduced screwthreaded terminal 14 on the outer part 10 of the housing 8. The outer part 10 comprises a solid body in which a central recess 15 is formed the diameter of which corresponds to the diameter of the bore. The outer end of the recess 15 communicates with a recess 16 which latter is eccentrically disposed so as to lie parallel with the longitudinal axis of the parts 9 and 10.

A diaphragm 16 is clamped between the parts 9 and 10 and is preferably formed of rubber although any other material may be used if desired. The diameter of the diaphragm is in excess of the diameter of the bore 11 and fits in a corresponding recess formed in said bore and is clamped from displacement by a ring 17. The diaphragm is adapted to be undulated by the pressure of air contained within the tire 6 as more fully hereinafter described.

The pressure responsive means which is actuated by the undulations of the diaphragm, to indicate the air pressure, consists especially of a cylindrical head 18 the inner end 19 of which is of substantially semi-spherical configuration and impinges the diaphragm 16. The outer end of the head has a rod 20 concentrically mounted thereon which extends into the eccentrically disposed recess 6 in the outer member 10 of the gauge. The rod 20 is provided with annular ribs 21 which are adapted to engage in mesh with a cogwheel 22 revolubly mounted within the part 10 of the gauge. The cogwheel wheel 22 is mounted upon a shaft 22' which carries a dial hand 23 so that rotation of the cogwheel 22 imparts a corresponding rotative movement to the dial hand 23. A discal graduated plate 24 is countersunk in the part 10 of the gauge which graduations may be numeraled so as to indicate the amount of air pressure contained within the tire 6 depending upon the position of the dial hand with respect to the graduations.

In order to normally hold the head 18 in engagement with the diaphragm 16 a spring 25 is provided one end of which is engaged with the bottom of the recess 15 and the other end engaged with the inner face of the head 18. The spring 25 is convoluted around the rod 20 and is held from lateral displacement by a sleeve 26.

Where the gauge is used with disk wheels a right angled air hose engaging tube is provided such as indicated at 27 and shown in Figs. 1 and 2 of the drawings. Where spoke wheels are provided a perpendicular air hose engaging tube is provided as shown in Fig. 3. In each instance, the usual standard type of valved air hose engaging tube is provided the inlet end of which must have its outlet within the plane of the diaphragm 16. In the form of invention shown in Figs. 1 and 2, it is apparent that the tube 27 communicates directly with the part 9 between the diaphragm 16 and the threaded end 12. In the form of invention as shown in Fig. 3 the tube 28 communicates with an air duct 29 which latter extends inwardly through the parts 9 and 10 and communicates with the bore 11 between the diaphragm 9 and screwthreaded end 12.

By making the nipple 7 of tapering configuration and correspondingly forming the threads 12 on the tire gauge it is possible to use the tire gauge with different sizes of tires if desired. Moreover, the gauge may be engaged with the wheel felly and tire with facility.

In operation after the tire gauge has been engaged with the wheel felly and tire in the manner above described the air hose may be engaged with either the tube 27 or the tube 28 as the case may be and the air permitted to pass unobstructedly into the bore 11 and through the nipple 7 into the tire. The back pressure of air from the tire will impinge the diaphragm 16 in an apparent manner so as to flex the latter and exert pressure upon the head 18 thereby moving the rod 20 outwardly in the recess 16 to cause the cogwheel 22 to be rotated with apparent results.

The parts of the device are simple and may be replaced at a very low cost and with facility. The diaphragm may be quickly replaced by disengaging the parts 9 and 10 which likewise permits removal of the dial hand operating mechanism with the exception of the cogwheel 22 and shaft 22'. These, however, are readily accessible by simply removing the dial face 24. It is, of course, to be understood that various changes may be made in this device especially in the details of construction, proportion and arrangement of parts within the scope of the claim hereto appended.

What is claimed:—

An air pressure gauge for pneumatic tires including a two-part housing one of which parts is connected to and in communication with the tire and provided with a screwthreaded recess, the other part of said housing being equipped with a screwthreaded extension, a diaphragm mounted in the recess of the first said housing part and clamped from displacement by the screwthreaded extension of the second mentioned housing part, air pressure responsive means constantly in contact with said diaphragm to be moved by the undulations of the latter but being unconnected thereto, and a dial operatively connected to said means and movable in correspondence with the latter.

In testimony whereof I affix my seal.

ROBERT P. OXLEY.